(12) United States Patent
Kracker et al.

(10) Patent No.: US 8,100,571 B2
(45) Date of Patent: Jan. 24, 2012

(54) LAMP ASSEMBLIES AND VEHICLES INCLUDING SAME

(75) Inventors: Thomas Kracker, Marysville, OH (US); Steven Kovach, Dublin, OH (US); Brent Andrees, Dublin, OH (US)

(73) Assignee: Honda Motor Company, Ltd., Tokyo (JP)

( * ) Notice: Subject to any disclaimer, the term of this patent is extended or adjusted under 35 U.S.C. 154(b) by 403 days.

(21) Appl. No.: 12/541,394

(22) Filed: Aug. 14, 2009

(65) Prior Publication Data

US 2011/0038170 A1    Feb. 17, 2011

(51) Int. Cl.
*F21V 21/14*    (2006.01)

(52) U.S. Cl. ......................................... 362/549; 362/487

(58) Field of Classification Search .................. 362/487, 362/507, 516, 549
See application file for complete search history.

(56) References Cited

U.S. PATENT DOCUMENTS

| 1,765,763 | A | | 6/1930 | Hyatt |
| 2,757,275 | A | | 7/1956 | Lehr |
| 2,910,577 | A | | 10/1959 | Bolmeyer |
| 3,565,499 | A | | 2/1971 | Fisher |
| 4,196,459 | A | | 4/1980 | Dick |
| 4,333,131 | A | | 6/1982 | Hujimoto et al. |
| 5,122,936 | A | | 6/1992 | Guthrie |
| 5,414,602 | A | | 5/1995 | Young et al. |
| 5,701,783 | A | * | 12/1997 | Lin .............................. 74/89.13 |
| 6,120,168 | A | * | 9/2000 | Brummel et al. ............. 362/507 |

* cited by examiner

*Primary Examiner* — David V Bruce
(74) *Attorney, Agent, or Firm* — Ulmer & Berne LLP

(57) ABSTRACT

A lamp assembly includes a reflective structure, a mounting structure, and a collar. The reflective structure at least partially surrounds and reflects light from a light source. The mounting structure is formed as a unitary structure with the reflective structure. The mounting structure is elongated and extends longitudinally from a proximal end to a distal end. The proximal end is adjacent to the reflective structure. The distal end is spaced from the reflective structure. The collar is engaged with the mounting structure such that an interface surface of the collar contacts an interface surface of the mounting structure. A fastener engagement portion of the collar is configured to selectively engage a fastener to facilitate mounting of the lamp assembly. The reflective structure and the mounting structure are both formed from a metal material, and the collar is formed from a different material. Vehicles are also provided.

20 Claims, 6 Drawing Sheets

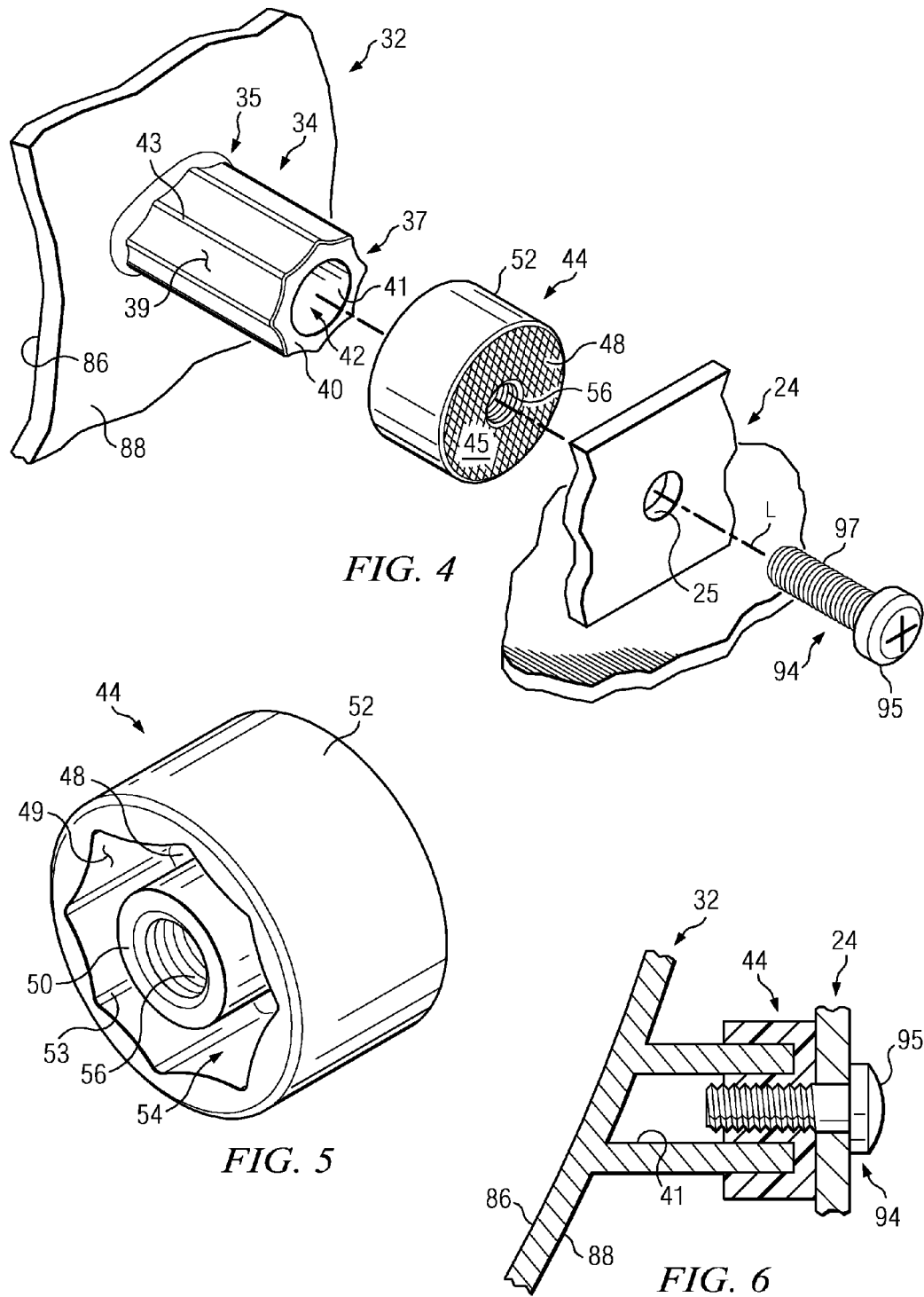

LAMP ASSEMBLIES AND VEHICLES INCLUDING SAME

TECHNICAL FIELD

The present invention relates to lamp assemblies and vehicles including lamp assemblies.

BACKGROUND

Vehicles often include headlamps, tail lamps, marker lamps, courtesy lamps, dome lamps, utility lamps, turn signal lamps, driving lamps, and/or fog lamps.

SUMMARY

In accordance with one embodiment, a lamp assembly comprises a reflective structure, a mounting structure, and a collar. The reflective structure is configured to at least partially surround and to reflect light from a light source. The mounting structure is formed as a unitary structure with the reflective structure. The mounting structure is elongated and extends longitudinally from a proximal end to a distal end. The proximal end is adjacent to the reflective structure. The distal end is spaced from the reflective structure. The mounting structure comprises a first interface surface. The collar comprises a second interface surface and a fastener engagement portion. The collar is engaged with the mounting structure such that the second interface surface contacts the first interface surface. The fastener engagement portion is configured to selectively engage a fastener to facilitate mounting of the lamp assembly to a body structure of a vehicle. The reflective structure and the mounting structure are both formed from a metal material. The collar is formed from a second material which is different from the metal material.

In accordance with another embodiment, a lamp assembly comprises a reflective structure, a first mounting structure, a second mounting structure, a first collar, and a second collar. The reflective structure is configured to at least partially surround and to reflect light from a light source. The first mounting structure is formed as a unitary structure with the reflective structure. The first mounting structure is elongated and extends along a longitudinal axis from a first proximal end to a first distal end. The first proximal end is adjacent to the reflective structure. The first distal end is spaced from the reflective structure. The first mounting structure comprises a first mounting structure interface surface. The second mounting structure is formed as a unitary structure with the reflective structure. The second mounting structure is elongated and extends along the longitudinal axis from a second proximal end to a second distal end. The second proximal end is adjacent to the reflective structure. The second distal end is spaced from the reflective structure. The second mounting structure comprises a second mounting structure interface surface. The first collar comprises a first collar interface surface and a first fastener engagement portion. The first collar is engaged with the first mounting structure such that the first collar interface surface contacts the first mounting structure interface surface. The second collar comprises a second collar interface surface and a second fastener engagement portion. The second collar is engaged with the second mounting structure such that the second collar interface surface contacts the second mounting structure interface surface. The first fastener engagement portion and the second fastener engagement portion are configured to selectively engage respective fasteners to facilitate mounting of the lamp assembly to a body structure of a vehicle. The reflective structure and the mounting structure are both formed from a metal material. The first collar and the second collar are formed from a second material which is different from the metal material.

In accordance with yet another embodiment, a vehicle comprises a bracket and a lamp assembly. The bracket defines a first aperture and a second aperture. The lamp assembly comprises a light bulb, a lens, a reflective structure, a first mounting structure, a second mounting structure, a first collar, a second collar, a first bolt, and a second bolt. The reflective structure is configured to at least partially surround and to reflect light from the light bulb. The first mounting structure is formed as a unitary structure with the reflective structure. The first mounting structure is elongated and extends along a longitudinal axis from a first proximal end to a first distal end. The first proximal end is adjacent to the reflective structure. The first distal end is spaced from the reflective structure. The first mounting structure comprises a first mounting structure interface surface. The second mounting structure is formed as a unitary structure with the reflective structure. The second mounting structure is elongated and extends along the longitudinal axis from a second proximal end to a second distal end. The second proximal end is adjacent to the reflective structure. The second distal end is spaced from the reflective structure. The second mounting structure comprises a second mounting structure interface surface. The first collar comprises a first collar interface surface and a first threaded aperture. The first collar is engaged with the first mounting structure such that the first collar interface surface contacts the first mounting structure interface surface. The second collar comprises a second collar interface surface and a second threaded aperture. The second collar is engaged with the second mounting structure such that the second collar interface surface contacts the second mounting structure interface surface. The reflective structure and the mounting structure are both formed from a metal material. The first collar and the second collar are formed from a second material which is different from the metal material. The first bolt comprises a first threaded end passing through the first aperture in the bracket and into the first threaded aperture in the first collar. The second bolt comprises a second threaded end passing through the second aperture in the bracket and into the second threaded aperture in the second collar.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

FIG. 4 is an exploded perspective view depicting selected components of FIG. 3;

FIG. 5 is a front perspective view depicting the collar of FIG. 4;

FIG. 6 is sectional view depicting the components of FIG. 4 as assembled;

DETAILED DESCRIPTION

Certain embodiments are hereinafter described in detail in connection with the views and examples of FIGS. 1-8 and 9A-9C, wherein like numbers illustrate like elements throughout the views. A lamp assembly as described herein can be provided upon any of a variety of suitable vehicles such as, for example, cars, trucks, vans, watercraft, utility vehicles, recreational vehicles, and aircraft. Such a lamp assembly can serve as a headlamp, tail lamp, marker lamp, courtesy lamp, dome lamp, utility lamp, turn signal lamp, driving lamp, or fog lamp, for example.

Figure 1:
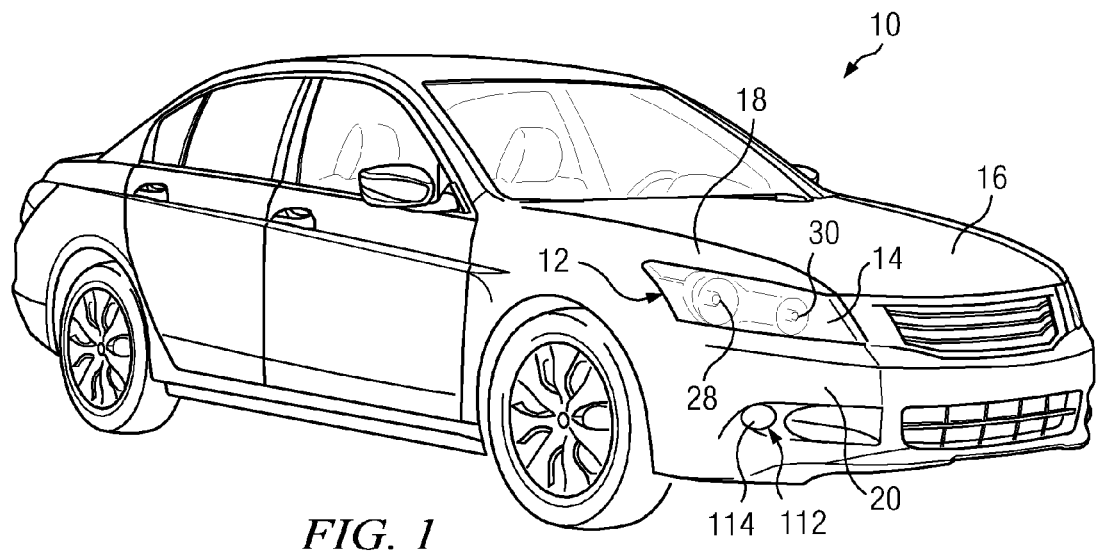
FIG. 1 is front perspective view depicting a vehicle having lamp assemblies in accordance with one embodiment.

A vehicle 10 is shown in FIG. 1 to include lamp assemblies 12 and 112. In one embodiment, the lamp assembly 12 can comprise a headlamp, and the lamp assembly 112 can comprise a fog lamp. The lamp assembly 12 is shown to be positioned at a forward end of the vehicle 10 and to be adjacent to other components of the vehicle 10 such as a hood 16, a fender 18, and a bumper 20. The lamp assembly 12 can include a light source such as one or more light bulbs (e.g., 28, 30, shown in FIGS. 1-2) which can be generally configured to illuminate a roadway or other terrain ahead of the vehicle 10. The light bulbs (e.g., 28, 30) can be any of a variety of suitable types such as, for example, standard incandescent, halogen, xenon, fluorescent, or light emitting diode (LED).

Figure 2:
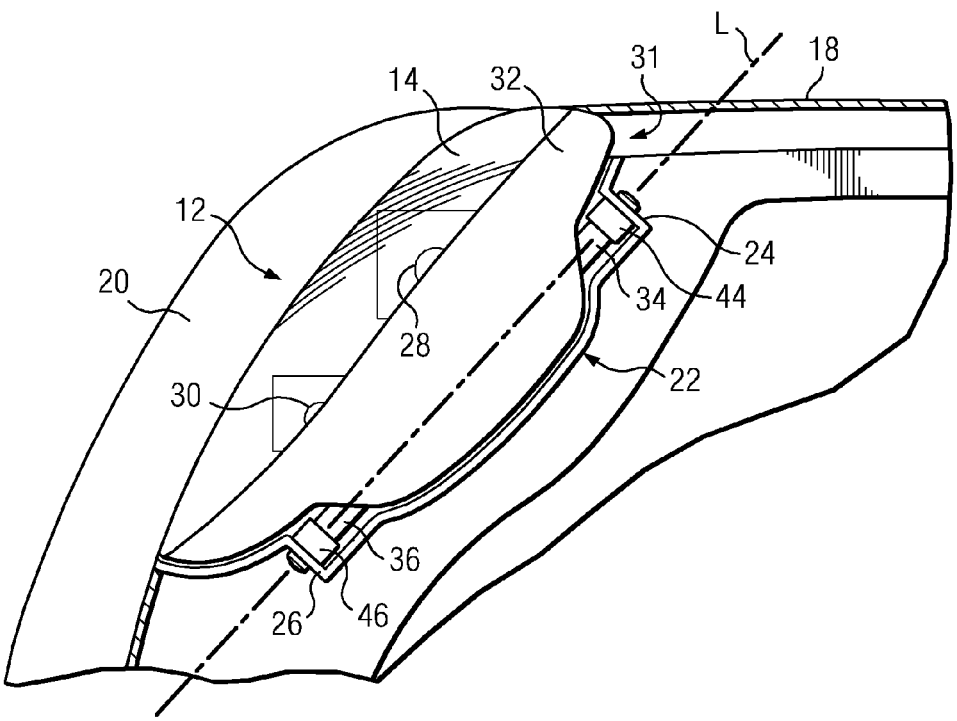
FIG. 2 is a top plan view depicting a portion of the vehicle of FIG. 1, wherein portions of a hood and a fender of the vehicle are removed for clarity of illustration.
Figure 3:
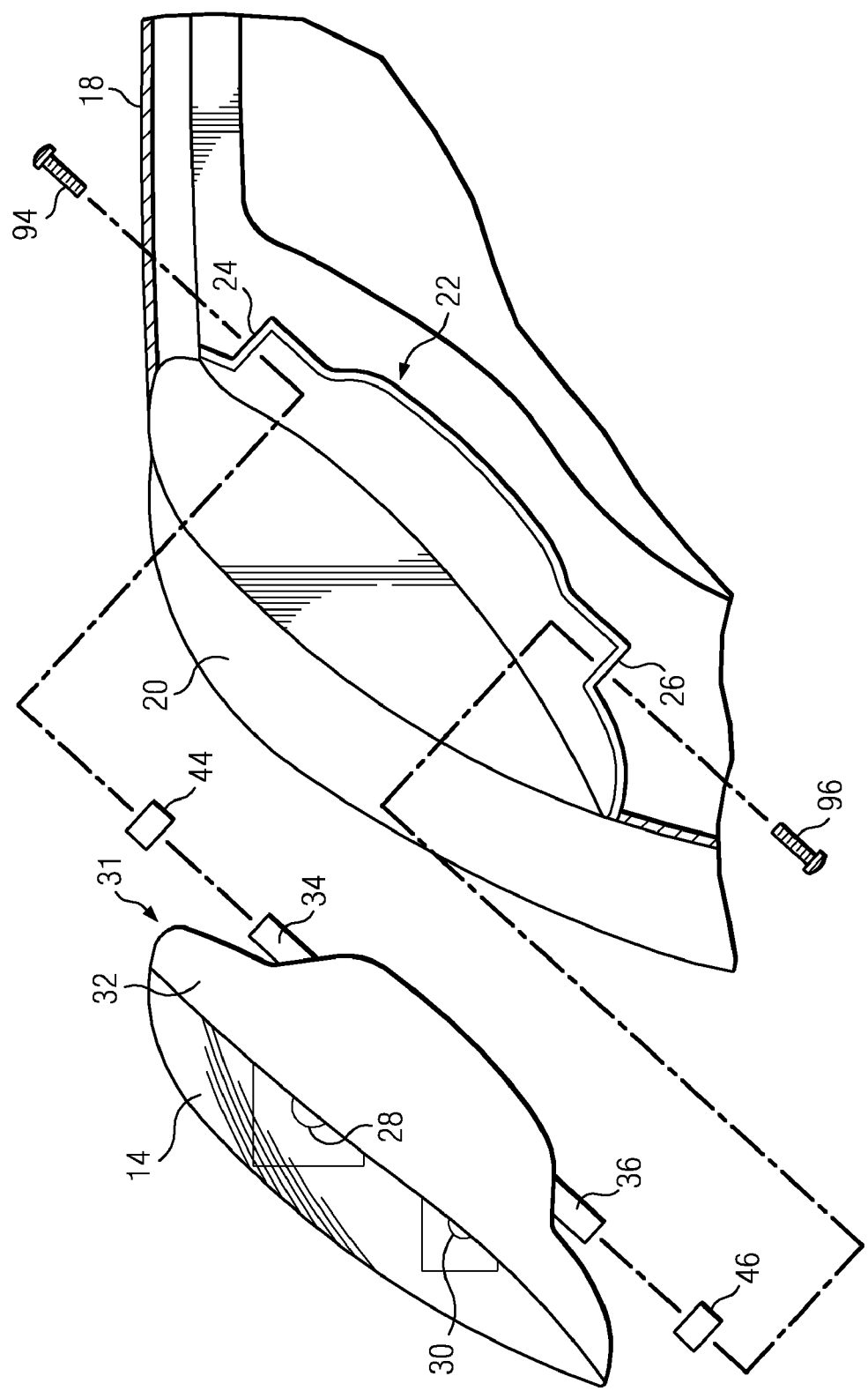
FIG. 3 is an exploded top plan view depicting the vehicular components of FIG. 3.

In addition to the light bulbs 28 and 30, the lamp assembly 12 can also include a housing 31 and a lens 14. The housing 31 can be configured to support the light bulbs 28 and 30 with respect to the fender 18 and/or other adjacent portions of the vehicle 10, and can be further configured to facilitate aiming of light from the light bulbs 28 and 30 in a predetermined pattern ahead of the vehicle 10. In one embodiment, such as shown in FIGS. 2 and 3, the lens 14 can be attached to the housing 31. However, in another embodiment, a lens might not be attached to a housing, but might rather be positioned apart from the housing (e.g., fixedly secured to a fender and/or another adjacent portion of a vehicle) such that the housing can be moveable relative to the lens.

The housing 31 can include a reflective structure 32 and mounting structures 34 and 36. The reflective structure 32 can be configured to at least partially surround and to reflect light from the light bulbs 28 and 30, as generally shown in FIGS. 2-3. As best shown in FIG. 6, the reflective structure 32 can comprise a front surface 86 and a rear surface 88. The front surface 86 can be polished or otherwise reflective such that it can reflect light from one or both of the light bulbs 28 and 30. However, in an alternative embodiment, the reflective structure of a lamp assembly might be positioned, shielded, or otherwise configured not to be directly impacted by light from a light bulb or other light source.

While the housing 31 is shown in FIGS. 2-3 as including two mounting structures (i.e. 34, 36), it will be appreciated that a housing of an alternative lamp assembly can comprise only a single mounting structure, or can include more than two mounting structures. In one embodiment, as shown in FIGS. 2-4 and 6, the mounting structure(s) (e.g., 34, 36) can be formed as a unitary structure with the reflective structure 32, such as through a casting process, for example. While both of the mounting structures 34 and 36 are shown to extend from the rear surface 88 of the reflective structure 32, it will be appreciated that one or more mounting structures of a lamp assembly might not extend from a rear surface of a reflective structure, but might alternatively extend from another portion of the reflective structure.

The mounting structure 34 is shown in FIG. 4 to be elongated and to extend along a longitudinal axis "L" from a proximal end 35 to a distal end 37. The proximal end 35 of the mounting structure 34 is shown to be adjacent to the rear surface 88 of the reflective structure 32. The distal end 37 of the mounting structure 34 is shown to be spaced from the reflective structure 32. Referring to FIG. 4, the mounting structure 34 can include a generally cylindrically-shaped interface surface 39 which is shown to be generally coaxial with the longitudinal axis "L" and to extend from the proximal end 35 to the distal end 37. In one embodiment, such as shown in FIG. 4, the interface surface 39 can define a plurality of ribs (e.g., 43) which extend parallel with the longitudinal axis "L", such that the interface surface 39 can be a knurled surface.

The mounting structure 34 can also include an end surface 40 provided at the distal end 37 of the mounting structure 34. In the embodiment of FIG. 4, the end surface 40 is shown to be generally annular in shape. The mounting structure 34 can further include a generally cylindrically-shaped bore surface 41 which is generally coaxial with the longitudinal axis "L" and which extends at least partially from the distal end 37 to the proximal end 35. The bore surface 41 is shown to define a generally cylindrical bore 42 in the mounting structure 34.

In the embodiment of FIGS. 1-6, the mounting structure 36 is configured similarly to the mounting structure 34, and both of the mounting structures 34 and 36 are spaced from one another and are attached to spaced portions of the rear surface 88 of the reflective structure 32. In one embodiment, as best shown in FIG. 2, both of the mounting structures 34 and 36 can extend along the longitudinal axis "L" which facilitates swiveling or pivoting of the housing 31 about the longitudinal axis "L", and resultant adjustability of the housing 31 for lamp aiming purposes.

The lamp assembly 12 can also include collars 44 and 46. With reference to FIGS. 4 and 6, the collar 44 can be removably engaged with the mounting structure 34. In particular, the collar 44 is shown in FIGS. 4-6 to comprise an end wall 48, an inner annular wall 50, and an outer annular wall 52. Each of the inner and outer annular walls 50 and 52 are shown to extend from the end wall 48 of the collar 44 and can cooperate to define an annular channel 54.

The end wall 48 and the inner annular wall 50 can cooperate to define a fastener engagement portion. In the example of FIGS. 4-6, the fastener engagement portion is shown to comprise a threaded aperture 56 which is configured to receive a threaded end 97 of a fastener (e.g., bolt 94). While the threaded aperture 56 is shown in FIG. 6 to be opened on both ends, it will be appreciated that, in an alternative embodiment, one end of the threaded aperture 56 (e.g., opposite the end wall 48) can be closed. In another alternative embodiment, a fastener engagement portion of a collar can comprise something other than a threaded aperture such as, for example, a non-threaded fastener-receiving aperture. In still another alternative embodiment, a fastener engagement portion of a collar can comprise a threaded shaft suitable to receive a nut.

Referring to FIG. 5, the outer annular wall 52 of the collar 44 can include a generally cylindrically-shaped interface surface 49. In one embodiment, such as shown in FIG. 5, the interface surface 49 can define a plurality of ribs (e.g., 53)

such that the interface surface 49 can be a knurled surface. The quantity and position of the ribs (e.g., 53) of the collar 44 can be similar to the quantity and position of the ribs (e.g., 43) of the mounting structure 34 such that the collar 44 can engage the mounting structure 34 in one position, or in a plurality of alternative positions. Though the bore surface 41 of the mounting structure 34 is shown to be generally smooth, it will be appreciated that, in an alternative embodiment, a bore surface of a mounting structure can include one or more longitudinally extending ribs (e.g., similar to rib 43 but extending into a bore of the mounting structure) for engaging corresponding ribs on a collar (e.g., similar to rib 53 but provided on an inner annular wall of the collar). In the embodiment of FIGS. 1-6, the collar 46 is configured similarly to the collar 44.

To assemble the lamp assembly 12, the collars 44 and 46 can be engaged with the respective mounting structures 34 and 36. For example, with reference to FIGS. 4-6, the annular channel 54 of the collar 44 can receive the distal end 37 of the mounting structure 34 such that the interface surfaces 39 and 49 contact one another. Also, when so engaged, the inner annular wall 50 of the collar 44 can be matingly received within the bore 42 of the mounting structure 34, as shown in FIG. 6. When the collar 44 and the mounting structure 34 are so engaged, any ribs (e.g., 53) provided on the collar 44 can interlock with any ribs (e.g., 43) provided on the mounting structure 34 so as to prevent rotation of the collar 44 with respect to the mounting structure 34 during such engagement. Additionally, as shown in FIG. 6, when so engaged, the end surface 40 of the mounting structure 34 can abut against the end wall 50 of the collar 44.

In this configuration, it will be appreciated that the interface surfaces 39 and 49 can define respective shapes which are complementary with one another. For example, a particular shape of the collar 44 (e.g., that defined by the interface surface 49) can be larger than a corresponding shape of the mounting structure 34 (e.g., that defined by the interface surface 39) such that a portion of the mounting structure 34 (e.g., interface surface 39) can be received within a corresponding portion of the collar 44 (e.g., interface surface 49), as shown in FIG. 6. As another example, another particular shape of the collar 44 (e.g., that defined by the inner annular wall 50) can be smaller than a corresponding shape of the mounting structure 34 (e.g., that defined by the bore surface 41) such that a portion of the collar 44 (e.g., inner annular wall 50) can be received within a corresponding portion of the mounting structure 34 (e.g., bore 42), as shown in FIG. 6. In the embodiment of FIGS. 1-6, the collar 46 is configured to engage the mounting structure 36 in a similar manner to which the collar 44 engages the mounting structure 34. It will be appreciated that a collar and/or mounting structure of a lamp assembly can be provided in any of a variety of suitable alternative configurations, and/or can engage one another in any of a variety of suitable alternative configurations. For example, in one alternative embodiment, a collar can be insert molded, overmolded, crimped, cast, or otherwise fixedly secured to a mounting structure.

Once the collars 44 and 46 are engaged with the respective mounting structures 34 and 36, bolts 94 and 96 can be provided to facilitate attachment of the lamp assembly 12 to a bracket 22. The bracket 22 is shown in FIGS. 2-3 to include first and second bracket portions 24 and 26 which can each define a respective aperture (shown as 25 in FIG. 4 with respect to the bracket portion 24). In one embodiment, the bracket 22 can be integrally provided by a unibody or other structure of the vehicle 10. In another embodiment, the bracket 22 can be a separate element which is configured for attachment (e.g., with welding, fasteners and/or adhesive) to a unibody or other structure of the vehicle 10. While the first and second bracket portions 24 and 26 are shown to be provided as part of a common structure, it will be appreciated that respective bracket portions of a bracket might not be provided by a common structure.

To facilitate attachment of the lamp assembly 12 to the bracket 22, a threaded end 97 of the bolt 94 passes through the aperture 25 in the bracket portion 24, then into the threaded aperture 56 in the collar 44, as shown in FIGS. 2 and 6. A head 95 of the bolt 94 can then be twisted (e.g., with a screwdriver or wrench) to facilitate tightening of the bolt 94. The threaded aperture 56 can thereby be configured to selectively engage the bolt 94 to facilitate mounting of the lamp assembly 12 to the bracket 22, and thus to the body structure of the vehicle 10. If the collar 44 and the mounting structure 34 are provided with corresponding ribs (e.g., 43, 53) which engage one another, it will be appreciated that twisting of the bolt 94 (e.g., with a screwdriver or wrench) might not result in rotation of the collar 44 with respect to the mounting structure 34. It will also be appreciated that the end wall 48 of the collar 44 can be provided with a textured surface 45 and/or some other feature such that, when the bolt 94 is tightened, the collar 44 will be unlikely to rotate with respect to the bracket portion 24. The bolt 96 can similarly be provided and tightened with respect to the collar 46. The bolts 94 and 96 can be selectively loosened and tightened to facilitate respective pivoting and securement of the housing 31 and collars 44 and 46 (e.g., with respect to the bracket 22) such that a beam of light projected by the lamp assembly 12 can be optimally positioned for driving of the vehicle 10.

The housing 31 can be formed from a metal material, such as magnesium or a magnesium alloy. One example of a suitable magnesium alloy includes a magnesium-aluminum alloy. By forming the housing 31 from magnesium or a magnesium alloy, the housing 31 can exhibit superior heat transfer and dissipation characteristics. Such characteristics can be particularly beneficial when the housing 31 is used in association with a light source (e.g., LEDs) prone to generating significant quantities of heat. Magnesium or a magnesium alloy can also enable the housing 31 to have relatively low weight and relatively high strength and durability.

When magnesium contacts certain dissimilar metals, galvanic corrosion can occur, particularly when water is present, thus resulting in damage to the magnesium component over an extended period of use. Accordingly, in one embodiment, the collars 44 and 46 can be formed from a different material than the metal material which forms the housing 31. The material forming the collars 44 and 46 can be selected such that its contact with the material forming the housing 31 is unlikely to result in significant galvanic corrosion. In one embodiment, the collars 44 and 46 can be formed from a non-corrosive material, such as for example high strength plastic. In another embodiment, the collars 44 and 46 can be formed from aluminum. In one particular embodiment, the housing 31 is formed from magnesium, the collars 44 and 46 are formed from aluminum or high strength plastic, and the bracket 22 and bolts 94 and 96 are formed from steel. In such a configuration, since the bracket 22 and the bolts 94 and 96 do not contact the housing 31, but rather are separated from the housing 31 by the collars 44 and 46, the likelihood that galvanic corrosion would occur can be diminished.

Figure 7:
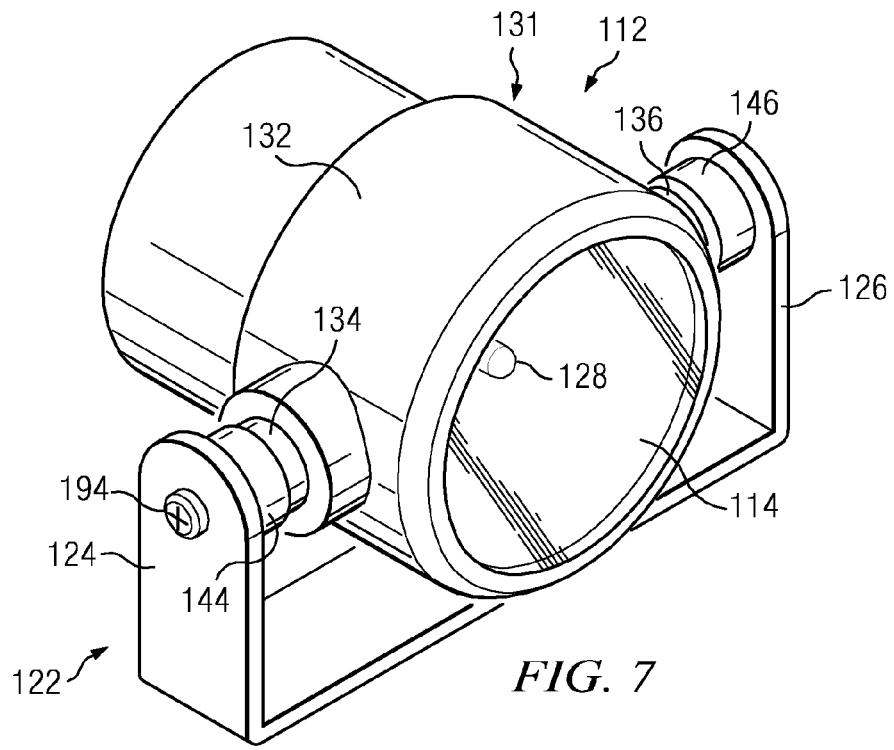
FIG. 7 is a front perspective view depicting one of the lamp assemblies of the vehicle of FIG. 1 as removed from the vehicle and in association with a bracket in accordance with one embodiment.
Figure 8:
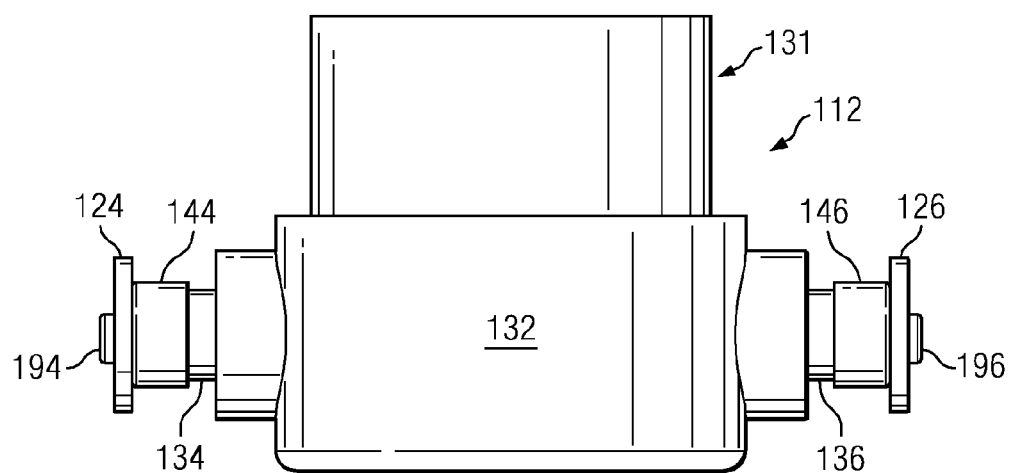
FIG. 8 is a top plan view depicting the lamp assembly of FIG. 7.

The lamp assembly 112 is shown in FIG. 1 to be positioned at a forward end of the vehicle 10 and to partially protrude through an opening in the bumper 20 of the vehicle 10. Referring now to FIGS. 7-8, the lamp assembly 112 can include a light bulb 128, a lens 114, a housing 131, and collars 144 and 146. The housing 131 is shown to include a reflective structure 132 and mounting structures 134 and 136. The collars 144 and 146 and mounting structures 134 and 136 can be configured similarly, and can respectively removably engage one another similarly, to that described herein with respect to the collars 44 and 46 and mounting structures 34 and 36. Also, as described herein with respect to the collars 44 and 46 and the housing 31, the collars 144 and 146 can be formed from a material (e.g., high strength plastic or aluminum) that is different than the material that forms the housing 131 (e.g., magnesium or a magnesium alloy).

To assemble the lamp assembly 112, the collars 144 and 146 can be engaged with the respective mounting structures 134 and 136, such as described above with respect to the collars 44 and 46 and the mounting structures 34 and 36. Once the collars 144 and 146 are engaged with the respective mounting structures 134 and 146, bolts 194 and 196 can be provided to facilitate attachment of the lamp assembly 112 to the bracket 122. The bracket 122 can include first and second bracket portions 124 and 126 which can each define a respective aperture (not shown). A threaded end of the bolt 194 can pass through an aperture in the bracket portion 124 and then into a threaded aperture in the collar 144. Similarly, a threaded end of the bolt 196 can pass through an aperture in the bracket portion 126 and then into a threaded aperture in the collar 146. The bolts 194 and 196 can then be twisted (e.g., with a screwdriver or wrench) to facilitate tightening of the bolts 194 and 196 and resultant securement of the lamp assembly 112 in a desired position with respect to the bracket 122. When the lamp assembly 112 is installed on the vehicle 10, as shown in FIG. 1, the bracket 122 and portions of the housing 131 can be concealed from view by the bumper 20 of the vehicle 10.

Figure 9A:
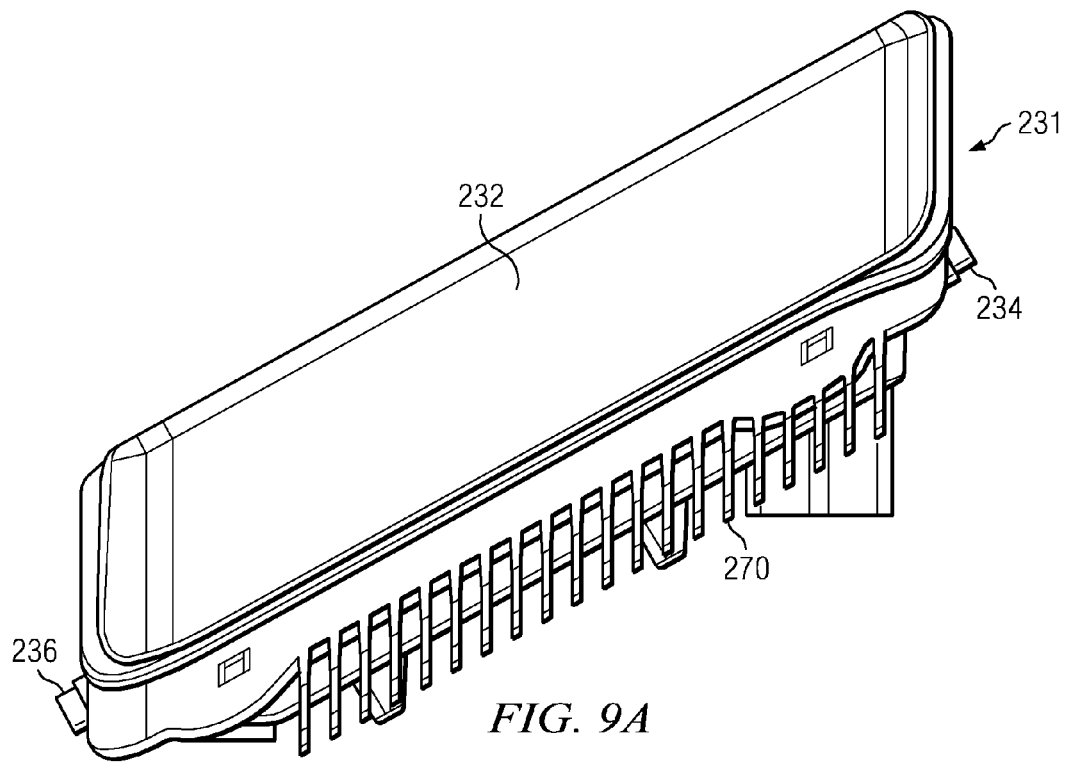
FIG. 9A is a top plan view depicting a portion of a fog lamp assembly in accordance with another embodiment.
Figure 9B:
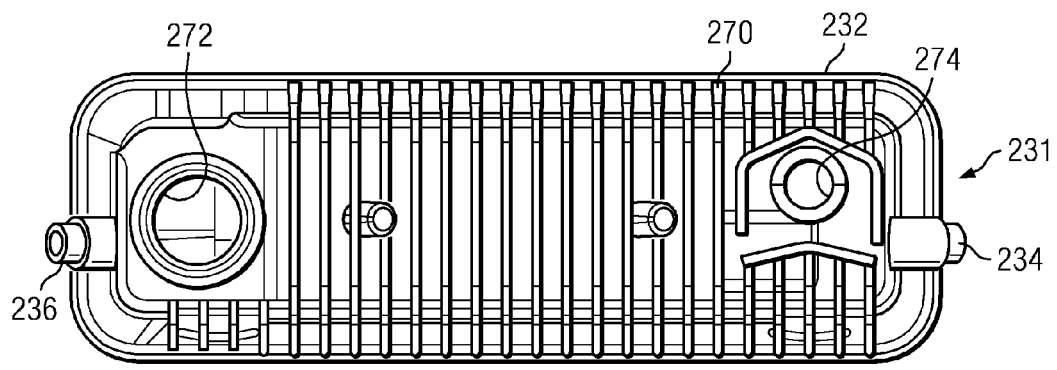
FIG. 9B is a rear elevational view depicting the portion of the fog lamp assembly of FIG. 9A.
Figure 9C:
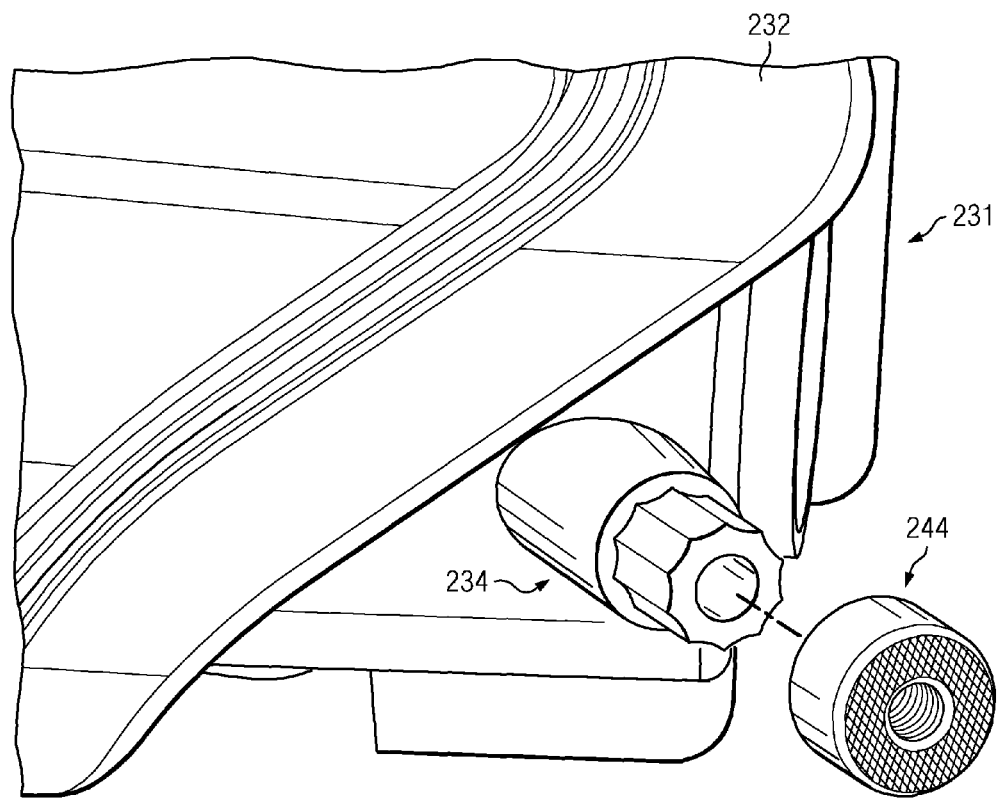
FIG. 9C is a perspective view depicting a portion of the housing of the fog lamp assembly of FIGS. 9A-9B in association with a collar.

It will be appreciated that a lamp assembly can be provided in any of a variety of other suitable configurations. For example, a housing 231 of a fog lamp assembly is shown in FIGS. 9A-9C. The housing 231 is shown to include a reflective structure 232 and mounting structures 234 and 236. The fog lamp assembly can also include a pair of collars (e.g., one shown as 244 in FIG. 9C). The collars (e.g., 244) and mounting structures 234 and 236 can be configured similarly, and can respectively removably engage one another similarly, to that described herein with respect to the collars 44 and 46 and mounting structures 34 and 36. Also, as described herein with respect to the collars 44 and 46 and the housing 31, the collars (e.g., 244) can be formed from a material (e.g., high strength plastic or aluminum) that is different than the material that forms the housing 231 (e.g., magnesium or a magnesium alloy).

To assemble the fog lamp assembly, the collars (e.g., 244) can be engaged with the respective mounting structures 234 and 236, such as described above with respect to the collars 44 and 46 and the mounting structures 34 and 36 of the lamp assembly 12. Once the collars (e.g., 244) are engaged with the respective mounting structures 234 and 246, bolts (not shown) can be provided to facilitate attachment of the fog lamp assembly to a bracket or other vehicular feature, such as described above with respect to the lamp assemblies 12 and 112.

The fog lamp assembly can also include a plurality of LED's (not shown) disposed at least partially within the reflective structure 232 of the housing 231. The reflective structure 232 can be provided with a heatsink having a plurality of fins (e.g., 270) to assist in dissipating heat generated by the LED's. One or more apertures (e.g., 272, 274) can be provided in the reflective structure 232 to facilitate passage of the LED's into the housing 231, and/or to facilitate passage of wires to LED's which are already present within the housing. In lieu of LED's, it will be appreciated that any of a variety of suitable alternative light sources can be provided. A lens (not shown) can be associated with the housing 231 to facilitate passage of light from within the housing 231, such as for illumination of a roadway ahead of the vehicle.

The foregoing description of embodiments and examples of the invention has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate the principles of the invention and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A lamp assembly comprising:
   a reflective structure configured to at least partially surround and to reflect light from a light source;
   a mounting structure formed as a unitary structure with the reflective structure, the mounting structure being elongated and extending longitudinally from a proximal end to a distal end, the proximal end being adjacent to the reflective structure, the distal end being spaced from the reflective structure, the mounting structure comprising a first interface surface;
   a collar comprising a second interface surface and a fastener engagement portion, the collar being engaged with the mounting structure such that the second interface surface contacts the first interface surface, the fastener engagement portion being configured to selectively engage a fastener to facilitate mounting of the lamp assembly to a body structure of a vehicle; wherein
   the reflective structure and the mounting structure are both formed from a metal material; and
   the collar is formed from a second material, the second material being different from the metal material.

2. The lamp assembly of claim 1 wherein the collar is removably engaged with the mounting structure.

3. The lamp assembly of claim 1 wherein the fastener engagement portion defines a threaded aperture configured to receive a threaded end of a fastener.

4. The lamp assembly of claim 1 wherein the first interface surface defines a first shape, the second interface surface defines a second shape, and the first shape is complementary with the second shape.

5. The lamp assembly of claim 4 wherein the second shape is larger than the first shape to facilitate receipt of a portion of the mounting structure within a corresponding portion of the collar.

6. The lamp assembly of claim 4 wherein the first interface surface is a first knurled surface, and the second interface surface is a second knurled surface.

7. The lamp assembly of claim 1 wherein the collar comprises an end wall, an inner annular wall, and an outer annular wall, the inner annular wall and the outer annular wall extending from the end wall and cooperating to define an annular channel, the annular channel receiving the distal end of the mounting structure, and the end wall and the inner annular wall cooperating to define the fastener engagement portion.

8. The lamp assembly of claim 1 wherein the reflective structure comprises a front surface and a rear surface, the front surface is configured to reflect light from a light source, and the mounting structure extends from the rear surface of the reflective structure.

9. The lamp assembly of claim 1 wherein the metal material comprises magnesium.

10. The lamp assembly of claim 1 wherein the metal material comprises a magnesium-aluminum alloy.

11. The lamp assembly of claim 1 wherein the second material comprises a non-corrosive material.

12. The lamp assembly of claim 1 wherein the second material comprises aluminum.

13. A lamp assembly comprising:
   a reflective structure configured to at least partially surround and to reflect light from a light source;
   a first mounting structure formed as a unitary structure with the reflective structure, the first mounting structure being elongated and extending along a longitudinal axis from a first proximal end to a first distal end, the first proximal end being adjacent to the reflective structure, the first distal end being spaced from the reflective structure, the first mounting structure comprising a first mounting structure interface surface;
   a second mounting structure formed as a unitary structure with the reflective structure, the second mounting structure being elongated and extending along the longitudinal axis from a second proximal end to a second distal end, the second proximal end being adjacent to the reflective structure, the second distal end being spaced from the reflective structure, the second mounting structure comprising a second mounting structure interface surface;
   a first collar comprising a first collar interface surface and a first fastener engagement portion, the first collar being engaged with the first mounting structure such that the first collar interface surface contacts the first mounting structure interface surface;
   a second collar comprising a second collar interface surface and a second fastener engagement portion, the second collar being engaged with the second mounting structure such that the second collar interface surface contacts the second mounting structure interface surface; wherein
   the first fastener engagement portion and the second fastener engagement portion are configured to selectively engage respective fasteners to facilitate mounting of the lamp assembly to a body structure of a vehicle;
   the reflective structure and the mounting structure are both formed from a metal material; and
   the first collar and the second collar are formed from a second material, the second material being different from the metal material.

14. The lamp assembly of claim 13 wherein the first collar is removably engaged with the first mounting structure, and wherein the second collar is removably engaged with the second mounting structure.

15. The lamp assembly of claim 13 wherein the first fastener engagement portion defines a first threaded aperture configured to receive a threaded end of a first fastener, and wherein the second fastener engagement portion defines a second threaded aperture configured to receive a threaded end of a second fastener.

16. The lamp assembly of claim 13 wherein the reflective structure comprises a front surface and a rear surface, the front surface is configured to reflect light from a light source, and the first mounting structure and the second mounting structure each extend from the rear surface of the reflective structure.

17. The lamp assembly of claim 13 wherein the metal material comprises magnesium.

18. A vehicle comprising:
   a bracket defining a first aperture and a second aperture; and
   a lamp assembly comprising:
      a light bulb;
      a lens;
      a reflective structure configured to at least partially surround and to reflect light from the light bulb;
      a first mounting structure formed as a unitary structure with the reflective structure, the first mounting structure being elongated and extending along a longitudinal axis from a first proximal end to a first distal end, the first proximal end being adjacent to the reflective structure, the first distal end being spaced from the reflective structure, the first mounting structure comprising a first mounting structure interface surface;
      a second mounting structure formed as a unitary structure with the reflective structure, the second mounting structure being elongated and extending along the longitudinal axis from a second proximal end to a second distal end, the second proximal end being adjacent to the reflective structure, the second distal end being spaced from the reflective structure, the second mounting structure comprising a second mounting structure interface surface;
      a first collar comprising a first collar interface surface and a first threaded aperture, the first collar being engaged with the first mounting structure such that the first collar interface surface contacts the first mounting structure interface surface;
      a second collar comprising a second collar interface surface and a second threaded aperture, the second collar being engaged with the second mounting structure such that the second collar interface surface contacts the second mounting structure interface surface;
      a first bolt comprising a first threaded end passing through the first aperture in the bracket and into the first threaded aperture in the first collar; and
      a second bolt comprising a second threaded end passing through the second aperture in the bracket and into the second threaded aperture in the second collar;
   wherein the reflective structure and the mounting structure are both formed from a metal material, and wherein the first collar and the second collar are formed from a second material, the second material being different from the metal material.

19. The vehicle of claim 18 wherein the reflective structure comprises a front surface and a rear surface, the front surface is configured to reflect light from the light bulb, and the first mounting structure and the second mounting structure each extend from the rear surface of the reflective structure.

20. The vehicle of claim 18 wherein the metal material comprises magnesium.

* * * * *